Sept. 10, 1946. E. E. BRUNNER Re 22,789

CONVEYER

Original Filed July 6, 1943 9 Sheets-Sheet 1

Inventor

E. E. BRUNNER

By

Otto Moeller

Attorney

Sept. 10, 1946. E. E. BRUNNER Re 22,789

CONVEYER

Original Filed July 6, 1943 9 Sheets-Sheet 2

Inventor
E. E. BRUNNER
By Otto Moeller
Attorney

CONVEYER

Original Filed July 6, 1943 9 Sheets-Sheet 3

Inventor

E. E. BRUNNER

By Otto Moeller

Attorney

Sept. 10, 1946. E. E. BRUNNER Re 22,789

CONVEYER

Original Filed July 6, 1943 9 Sheets-Sheet 4

Inventor
E. E. BRUNNER
By Otto Moeller
Attorney

Sept. 10, 1946. E. E. BRUNNER Re 22,789

CONVEYER

Original Filed July 6, 1943 9 Sheets-Sheet 5

Inventor
E. E. BRUNNER

By

Otto Moeller

Attorney

Sept. 10, 1946. E. E. BRUNNER Re 22,789

CONVEYER

Original Filed July 6, 1943 9 Sheets-Sheet 6

Inventor

E. E. BRUNNER

By Otto Moeller

Attorney

CONVEYER

Original Filed July 6, 1943 9 Sheets-Sheet 7

Inventor
E. E. BRUNNER
By Otto Moeller
Attorney

Sept. 10, 1946. E. E. BRUNNER Re 22,789
CONVEYER
Original Filed July 6, 1943 9 Sheets-Sheet 8
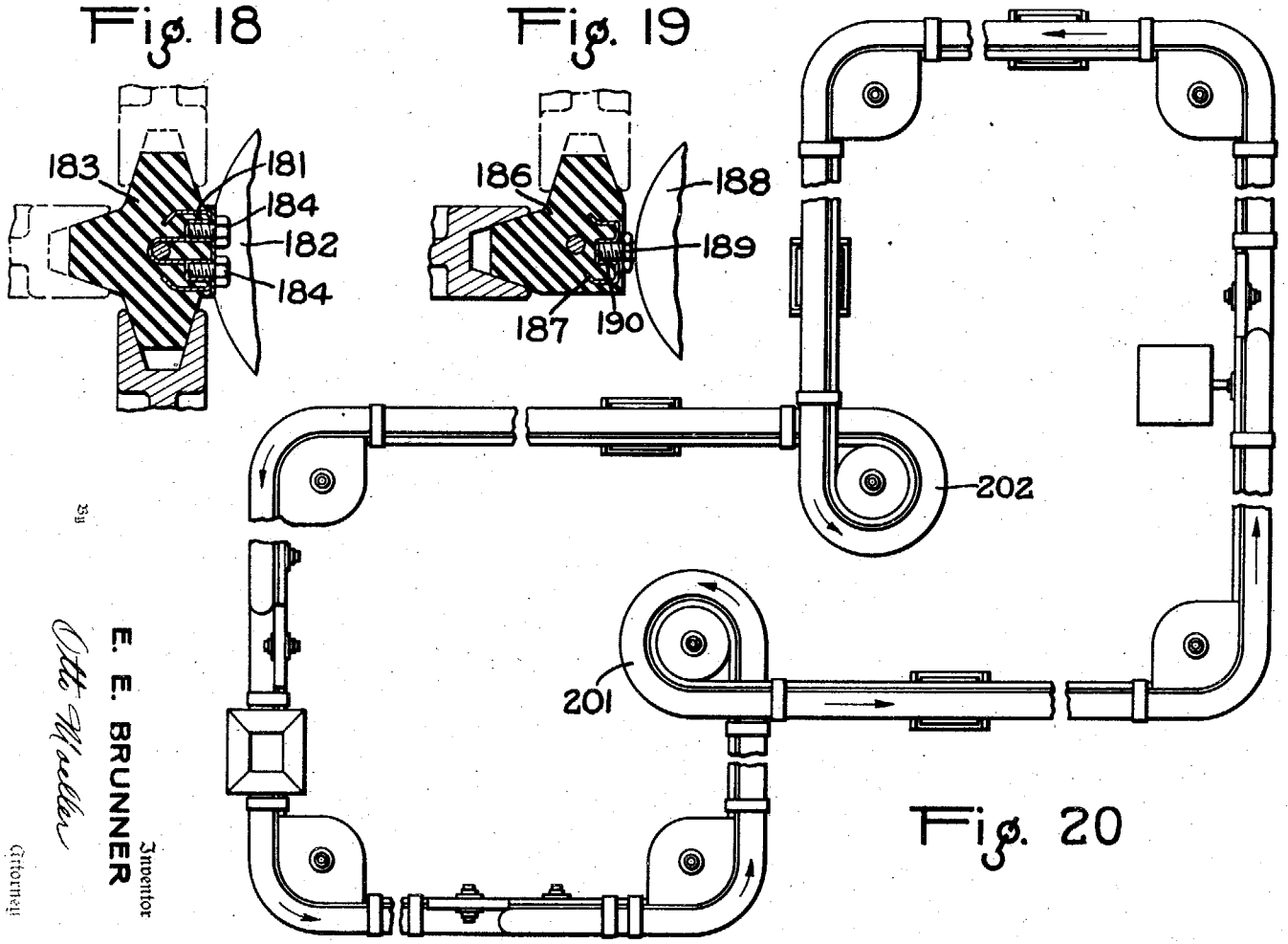
Inventor
E. E. BRUNNER
By Otto Moeller
Attorney Sept. 10, 1946. E. E. BRUNNER Re 22,789
CONVEYER
Original Filed July 6, 1943 9 Sheets-Sheet 9
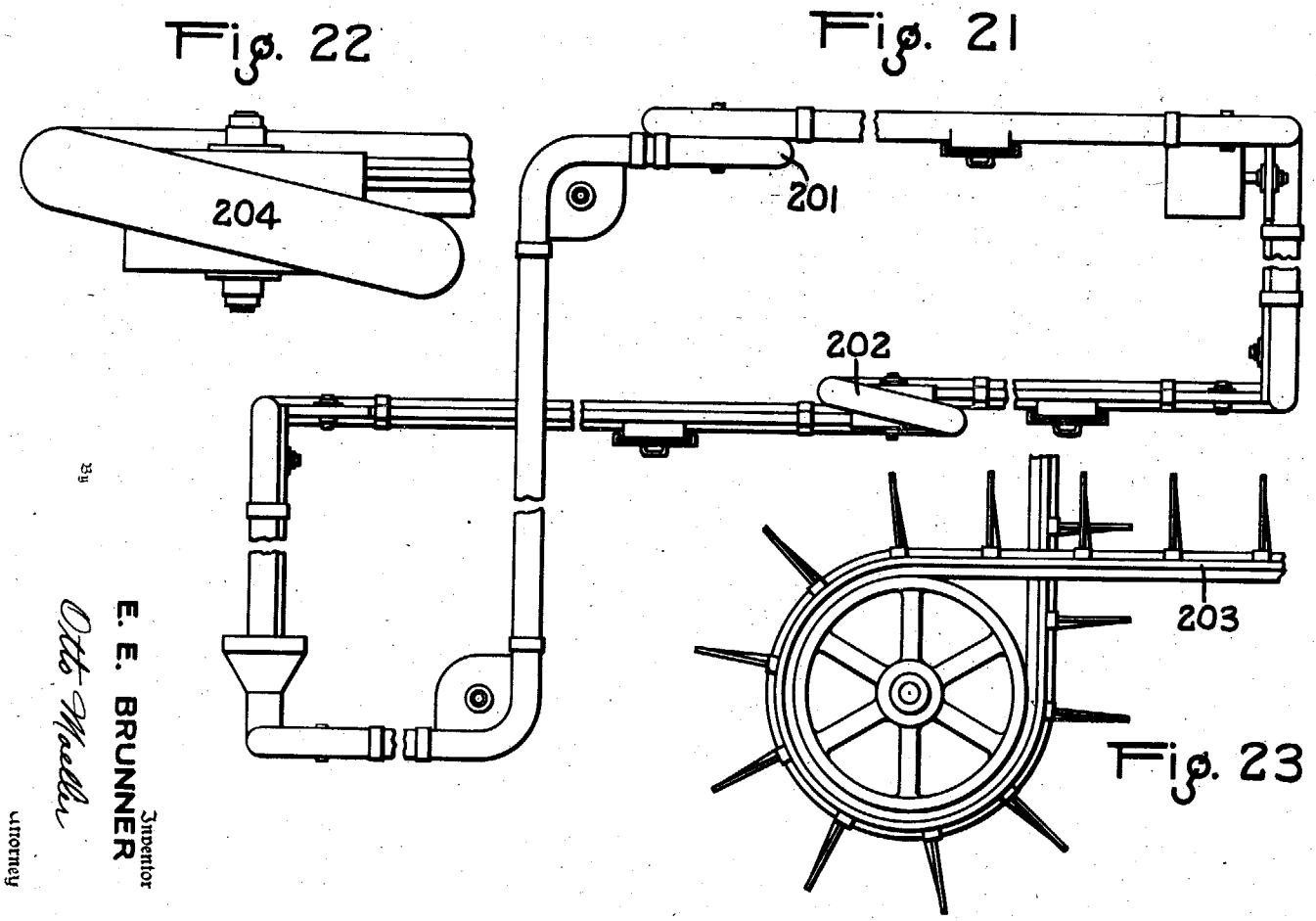
Inventor
E. E. BRUNNER
By
Otto Moeller
Attorney Reissued Sept. 10, 1946

Re. 22,789

UNITED STATES PATENT OFFICE 22,789

CONVEYER

Eugene E. Brunner, York, Pa., assignor to Read Machinery Co. Inc., York, Pa., a corporation of Pennsylvania Original No. 2,383,932, dated September 4, 1945, Serial No. 493,639, July 6, 1943. Application for reissue January 8, 1946, Serial No. 639,733

9 Claims. (Cl. 198—168)

This invention relates to a conveyer for conveying flowable solid material of the type in which a conveying element having transversely extended flights is drawn through a conduit or casing.

An object of the invention is to provide an improved conveyer of the character specified having a novel and improved conveying element particularly designed to be arranged to travel in the vertical and horizontal planes in a number of directions.

Another object of the invention is to provide an improved poly-plane conveyer having a casing providing a pair of tubes having a slot formed lengthwise therebetween, and having a conveyer element disposed within the casing and including an endless belt disposed in one of the tubes and a series of flights disposed in the other tube and connected to the endless belt by means extending through the slot.

Another object of the invention is to provide an improved conveyer having a conveyer element including an endless belt and a series of flight units, the main body portion of which is formed of sheet metal having one or more openings therein, a reinforcing rib of sheet metal fastened edgewise to one face of the main body of each flight unit and being of triangular form with the base portion of the rib disposed adjacent to one side edge of the main body portion, a bracket secured to the main body portion and to the base portion of the reinforcing rib and attached to the endless belt.

Another object of the invention is to provide an improved conveyer in which the constituent elements are assembled and proportioned so that the conveyer conveys the material en masse in a circuit having many directions and extending through a combination of horizontal, vertical and angular planes.

With the foregoing and other objects and advantages in view, the invention consists in the preferred construction and arrangement of the several parts which will be hereinafter fully described and claimed.

In the accompanying drawings:

Fig. 12 is a view similar to Fig. 8 of another form of the device;

Fig. 13 is a sectional view showing another form of conveyer belt;

Fig. 18 is a sectional view of another form of conveyer belt.

Fig. 19 is a sectional view showing another form of conveyer belt;

Fig. 20 is a plan view showing another form of conveyer;

Fig. 21 is a front elevation of the conveyer shown in Fig. 20;

Fig. 22 is an enlarged elevation of a portion of the structure shown in Fig. 21; and Fig. 23 is a detail view of a portion of the structure shown in Fig. 21, the casing being removed.

The present invention contemplates a conveyer comprising a casing provided with an inlet and one or more outlets, and with a conveyer element having a plurality of spaced flights arranged to be drawn through the casing to effect the conveyance therethrough of solid flowable material. The conveying element is so formed that it is capable of being arranged in the form of a loop extending through a plurality of planes, as will be hereinafter more fully described.

Figures 1, 2:
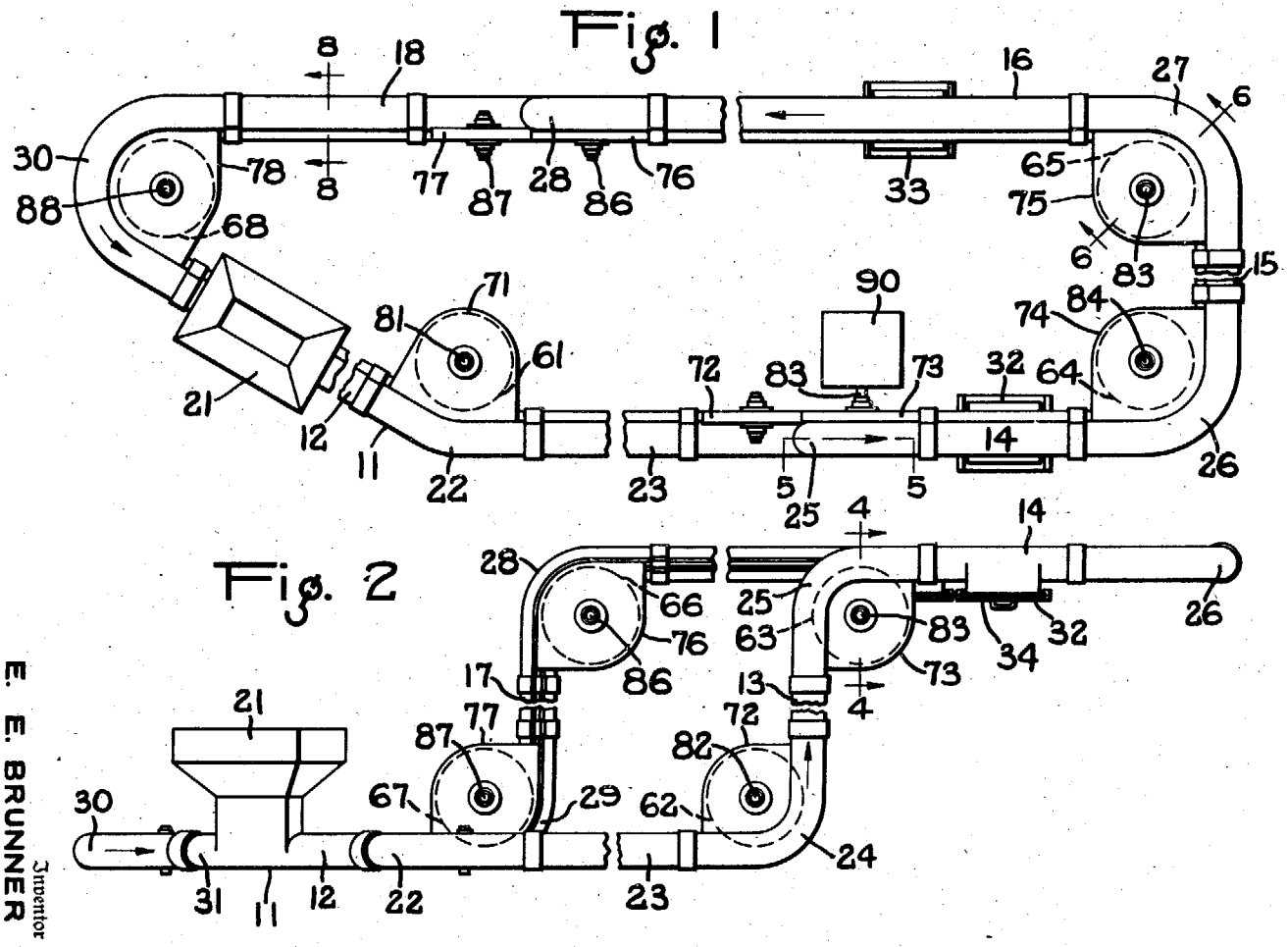
Fig. 1 is a plan view of a conveyer embodying the present invention.
Fig. 2 is a front elevation of the conveyer shown in Fig. 1.

Referring to Figs. 1 and 2, the improved conveyer of the present invention comprises a casing 11 having a horizontal leg 12, a vertical leg 13, a second horizontal leg composed of sections 14, 15 and 16 in the form of a U, a second vertical leg 17, and finally a section 18 of the horizontal leg 12.

Thus, as shown in Figs. 1 and 2, the conveyer may comprise a single poly-plane loop commencing with an inlet 21 in the leg 12 and ending at said inlet, the conveyer differing from most conveyers of this type in that the casing and the conveying element therein are adapted to extend through more than two planes or paths. For instance, from the inlet 21, the horizontal leg 12 may extend a suitable distance in a predetermined direction. At the end of the leg 12, the conveyer may be formed with a bent or curved portion 22 from which a horizontal leg 23 may extend for a suitable distance to the lower end of the vertical leg 13.

Connecting the ends of the legs 13 and 23 is an arcuate section 24, which may be in the nature of a right angle bend, as shown in Fig. 2.

A similar arcuate section 25 may connect the upper end of the leg 13 to an end of the leg 14, so that the sections 23, 24, 13, 25 and 14 of the conveyer are all arranged in substantially the same vertical plane, as shown in Fig. 1.

Since the legs 14, 15 and 16 may all lie in substantially the same horizontal plane, an arcuate section or right angle bend 26 may connect leg 14 with leg 15, and a similar arcuate portion 27 may connect leg 15 with leg 16.

In the arrangement shown in Fig. 1, legs 14 and 16 are arranged substantially parallel in the same horizontal plane, and leg 15 is disposed substantially at right angles thereto, so that in plan this portion of the conveyer is in the form of a U. The distance between the legs 14 and 16 may be varied to suit the installation conditions of the conveyer. Likewise, the length or height of the legs 13 and 17 may be varied to suit conditions.

The curved joints or elbows 26 and 27 are shown arranged in a horizontal plane.

The legs 16 and 17 may be connected by a vertically arranged arcuate section or elbow 28, and the legs 17 and 18 may be connected by a similarly arranged arcuate section or elbow 29.

The leg 18 may be arranged in the same horizontal plane with the leg 12, being connected thereto by an arcuate section or elbow 30 and a short straight section 31 which joins the arcuate section or elbow 30 with the end of inlet 21.

Since the conveyer casing 11 is in the form of a continuous unbroken loop, discharge outlets may be arranged at suitable points throughout the length of the conveyer, such as indicated at 32 and 33. It will be understood, however, that the location of the discharge outlets shown in Figs. 1 and 2, is for illustrative purposes only, and that these outlets can be located at any desired points in the conveyer, and also as many outlets can be provided as desired. This is also true of the location of the inlet 21, since the same may be located in the conveyer at any convenient point.

A suitable gate 34 of any usual or preferred construction may be provided at each outlet for controlling the flow of material therethrough.

Referring to Figs. 1 to 8 inclusive, which illustrate the detail construction of one form of the improved conveyer, the casing 11 comprises two sections 41 and 42.

Figure 8:
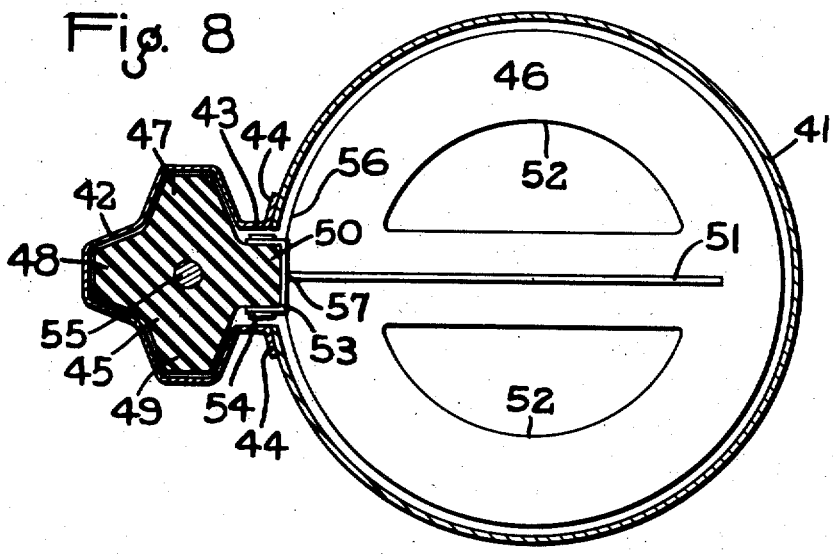
Fig. 8 is a section taken on the line 8—8 of Fig. 1.

As shown best in Fig. 8, the section 41 of the conveyer casing may be in the form of a tube or conduit, substantially circular in cross section.

A slot 43 is formed in the tubular wall of the casing between the two sections 41 and 42 thereof, said slot being coextensive with the length of the casing.

The conveying element of the present invention comprises an endless belt 45 having a series of flights 46 mounted thereon at spaced intervals.

The belt 45 is disposed within the section 42 of the casing, and the flights 46 are disposed within the section 41, the configuration of the casing being such that both portions of the conveying element are disposed in spaced relation with respect to the wall of the casing.

The belt 45 is preferably formed with three V-shaped ribs 47, 48 and 49, and a fourth rib 50 which may be disposed in the slot 43 when the casing is constructed in the manner shown.

The ribs 47 and 49 are diametrically disposed, the rib 47 constituting an upper rib and the rib 49 constituting a lower rib.

The ribs 48 and 50 are diametrically disposed, the rib 48 constituting an outer laterally disposed rib and the rib 50 constituting an inner laterally disposed rib.

The purpose of arranging the ribs 47, 48, 49 and 50 at right angles to each other in the manner shown in Fig. 8 will be hereinafter more fully described.

Each flight 46 may be formed from sheet metal or plate steel of suitable gauge.

Secured to one face of each flight 46 is a reinforcing rib 51 (see Figs. 7 and 8), of triangular form and having a side or leg portion 57 disposed adjacent to the side edge 56 of the flight.

One or more openings 52 may be formed in each flight. These openings may be of any size and have any desired configuration.

Figure 7:
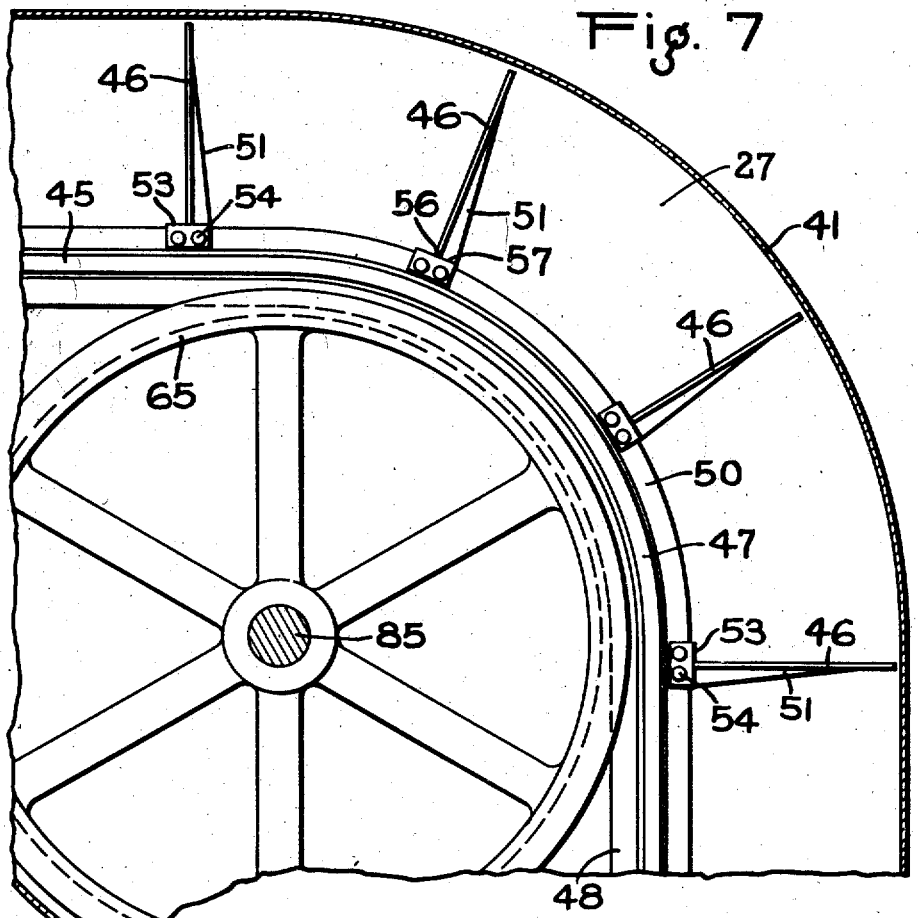
Fig. 7 is a section taken on the line 7—7 of Fig. 6.

Secured to the edge portion 56 of each flight 46 and to the portion 57 of each rib 51, is a bracket 53 adapted to be mounted on the rib 50 of the conveyer belt in the manner shown best in Figs. 7 and 8, and secured thereto by means of pins, screws, bolts, rivets, or other suitable fastening means 54.

In the form of belt shown in Fig. 8, the rib 50 of the belt is substantially rectangular in cross section and the brackets 53 are correspondingly formed to be rigidly or tightly mounted on said rib.

Arranged at suitable points throughout the length of the casing 11, is a series of sheaves 61, 62, 63, 64, 65, 66, 67 and 68.

It will be understood that any number of sheaves may be installed in the conveyer, depending upon the configuration and length of the circuit. In the present instance a sheave is shown disposed at each point in the conveyer casing 11 having an elbow or arcuate section. Some of the sheaves have horizontal axes so as to be vertically disposed and other sheaves have vertical axes so as to be horizontally disposed. Not all of the sheaves are shown in detail in the drawings, since all of the sheaves may be similarly constructed, as shown in Figs. 4 and 7.

Since the conveying element is enclosed by the casing 11, each sheave should also be enclosed. Thus, as shown in Figs. 1 and 2, sheave 61 is enclosed by a casing 71, and sheaves 62 to 68 inclusive are likewise enclosed by casings 72 to 78, inclusive, respectively.

Figure 4:
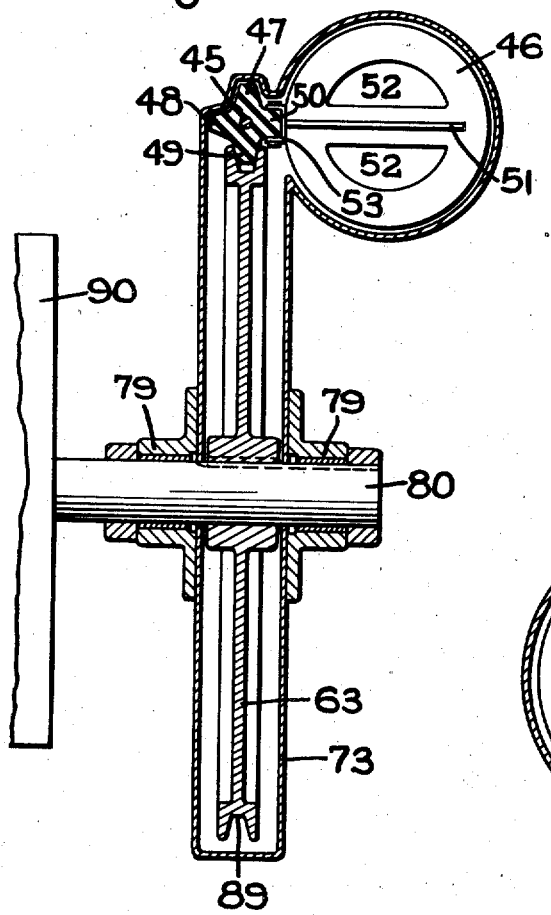
Fig. 4 is a vertical transverse section taken on the line 4—4 of Fig. 2.

These enclosures for the several sheaves may be constructed as extensions of the casing section 41, as shown in Fig. 4.

Each enclosure 71 to 78 inclusive is provided with bearings 79 for the shafts 81 to 88 inclusive of the sheaves 61 to 68 inclusive, respectively.

Each sheave has a groove 89 for receiving a rib of the belt 45.

Figure 3:
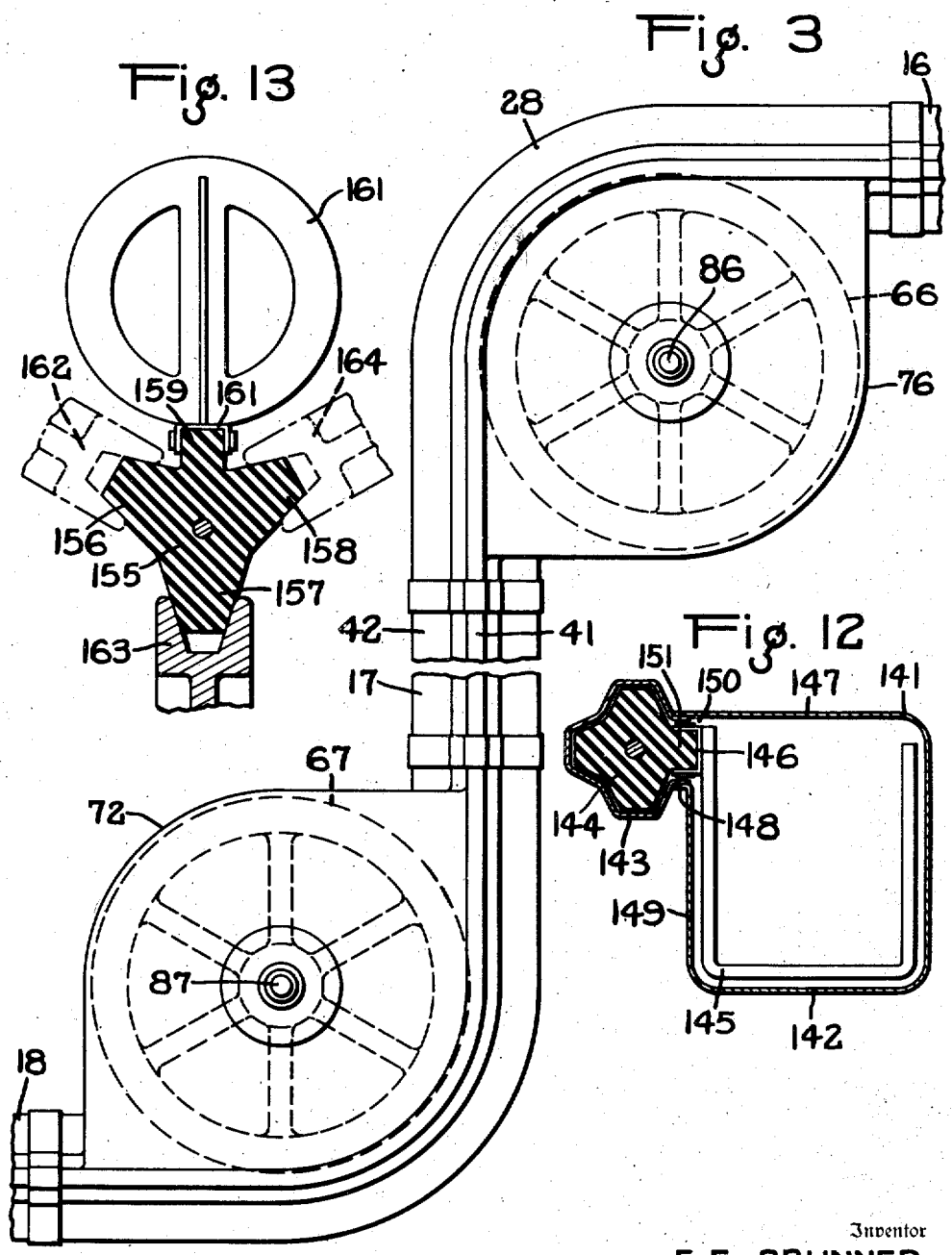
Fig. 3 is an enlarged elevation of a portion of the structure shown in Fig. 2.
Figure 6:
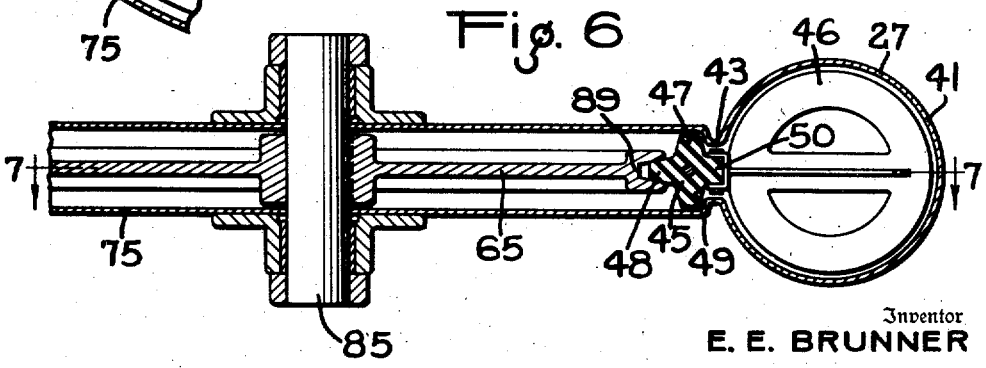
Fig. 6 is a section taken on the line 6—6 of Fig. 1.

In order that the flights 46 and the belt 45 will remain at all times in the same position within the casing 11 without any tendency to twist or turn out of such position while traveling through the casing, the sheaves are so arranged that, in the horizontal legs of the conveyer, the rib 48 of the belt is disposed in the groove 89 of the sheaves 61, 64, 65 and 68, which said sheaves are the several sheaves of the conveyer having vertically disposed axles or shafts (see Fig. 6); the rib 47 is supported by the grooves of the sheaves 62 and 67; and the rib 49 is supported by the grooves of the sheaves 63 and 66 (see Fig. 4), said sheaves 62, 67, 63 and 66 being the several sheaves having the horizontally disposed axles or shafts. Thus, it will be noted that in the form of conveyer shown in Figs. 1 and 2, there are two sets of vertically disposed sheaves, one set of sheaves being adapted to engage with the rib 49 to support the conveying element in the manner shown in Fig. 4, and the other set of sheaves being adapted to engage the rib 47, in the portion of the conveyer such as shown at the bottom of Fig. 3. The horizontally disposed sheaves which engage the rib 48 of the belt are adapted to support the conveying element throughout the horizontal legs of the conveyer, as shown in Fig. 6. It will be noted that with the provision of the three ribs 47, 48 and 49, with which the belt 45 is formed, it is possible to construct the conveyer with the series of horizontal and vertical legs, heretofore referred to, all of which legs may extend in numerous directions, such as is diagrammatically illustrated in Figs. 1 and 2. The invention, however, is not limited to the precise configuration of conveyer shown, since, due to the manner in which the conveying element is constructed, the apparatus is capable of being arranged in many other forms without departing from the invention. Also it will be understood that the sheaves can be located at any desired positions throughout the conveyer.

The belt 45 can be formed of suitable molded material, reinforced in any manner, and in order to limit to a minimum the amount of stretching of the material used in constructing the belt 45, a cable or similar element 55 can be embedded lengthwise within the molded material, as shown in Fig. 8.

For the purpose of pulling the conveying element through the casing, an electric motor or other suitable prime mover device 90 can be operatively connected to a shaft of one of the sheaves. As shown in Fig. 1, the shaft 83 of sheave 63 is operatively connected to motor 90.

Figure 9:
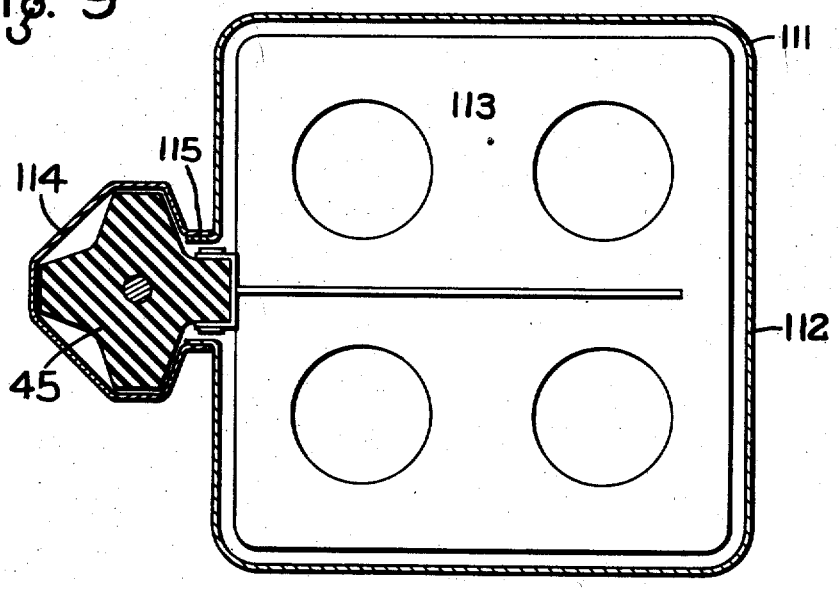
Fig. 9 is a view similar to Fig. 8 showing a modification.

Another form of casing 111 is shown in Fig. 9, having a rectangular tubular section 112 for a correspondingly formed flight 113 and a smaller tubular section 114 for the conveyer belt. The conveyer belt of the form of the invention shown in Fig. 9 is similar in construction to the belt 45 heretofore described. A slot 115 is formed between the two tubular sections 112 and 114 of the casing 111, said slot being similar to the slot 43 shown in Fig. 8.

Figure 10:
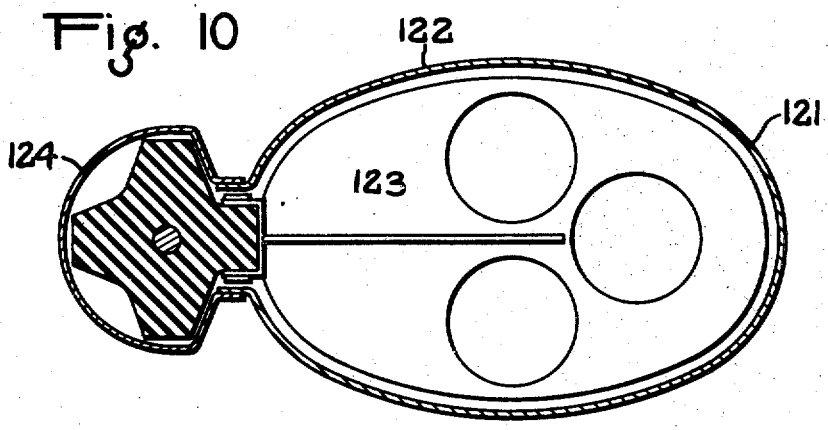
Fig. 10 is a view similar to Fig. 8 showing another form of the device.

Fig. 10 shows a casing 121 having a section 122 for a flight 123 of elliptical form, and a section 124 for the conveyer belt. In other respects the form of the conveyer shown in Fig. 10 is similar to the form of conveyer shown in Figs. 1 to 8 inclusive. This form of conveyer is adapted to be used for transporting materials found not suitable for conveying in the forms of conveyers shown in Figs. 8 and 9.

Although the casing of the conveyer may be constructed of any suitable material, sheet metal of suitable gauge will, in most instances, be found to be the best material for use in forming the several sections of the conveyer casing. In Fig. 8, the casing section 41 is shown as being formed of a single piece of sheet metal of suitable length bent lengthwise to substantially circular form, and the casing section 42 may also be formed of a single piece of sheet metal bent lengthwise to the desired configuration to enclose the belt 45 in the manner shown. In order to secure the two sections 41, 42 together, section 42 may be formed with longitudinally extending outwardly projecting flanges 44 adapted to be secured to the longitudinal edges of the section 41 by any suitable means such as by welding. This manner of constructing the sections of the conveyer casing may also be followed in forming the conveyers of the forms shown also in Figs. 9 and 10.

Figure 11:
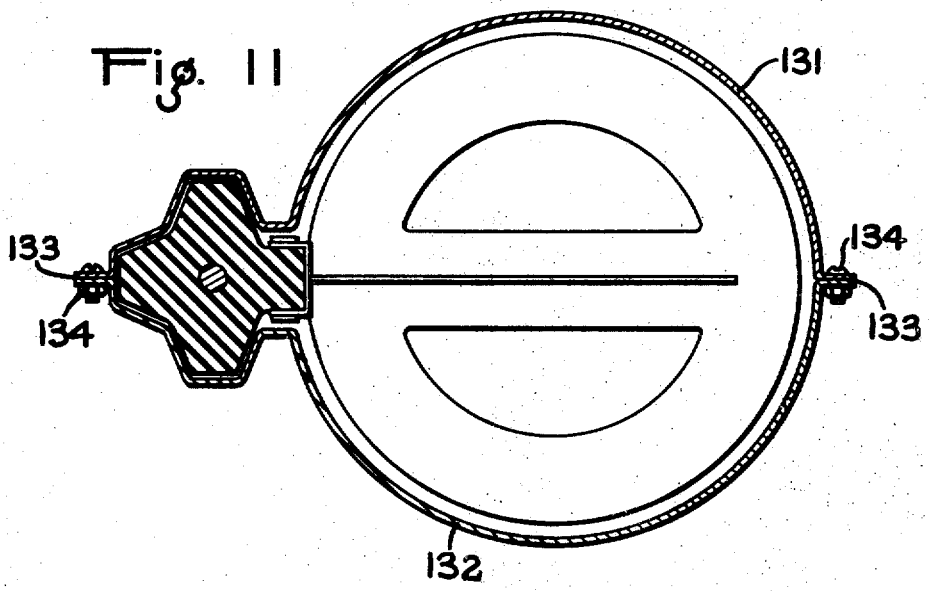
Fig. 11 is a view similar to Fig. 8 showing a still further form of the device.

On the other hand, the conveyer casing may be formed of two complementary sections 131 and 132 having marginal flanges 133 detachably secured together by bolts 134, as shown in Fig. 11.

Another form of the invention is shown in Fig. 12, in which the conveyer casing 141 is formed with a section 142 of rectangular cross section and a section 143 of polygonal cross section.

The belt 144 of the conveyer element which is enclosed by section 143, is similar in construction to the belt 45 heretofore referred to, and said casing section 143 may be similar in form to the section 42 shown in Fig. 8.

Individual U-shaped flight members 145, each having an arm formed with a bracket 146 fixed to the belt 144 in the manner shown in Fig. 8, are disposed within the rectangular section 142 of the casing 141.

The section 143 is carried by the top 147 and a flange 148 of the side wall 149 of the section 142, the flange 148 being spaced from the top 147 a suitable distance so as to provide a slot or gap 150 in which the bracket 146 and rib 151 of the belt 144 are disposed.

Fig. 13 illustrates a modified form of belt 155 adapted for use with a conveyer of the type herein described, said belt 155 having three ribs 156, 157 and 158. These ribs are angularly disposed with respect to each other and project outwardly from the body of the belt on center lines disposed approximately 120 degrees apart. Between any two of the angularly disposed ribs, the belt 155 may be formed with a fourth rib 159 for receiving the bracket 160 of flight 161 adapted to be attached to the belt in the manner heretofore described. With the belt of the form shown in Fig. 13, the several sheaves 162, 163 and 164 can be arranged in the manner shown so that the belt will be guided in paths extending in a plurality of directions.

Figure 14:
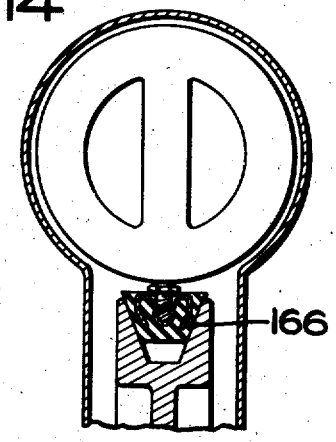
Fig. 14 is a sectional view of another form of conveyer belt.
Figure 15:
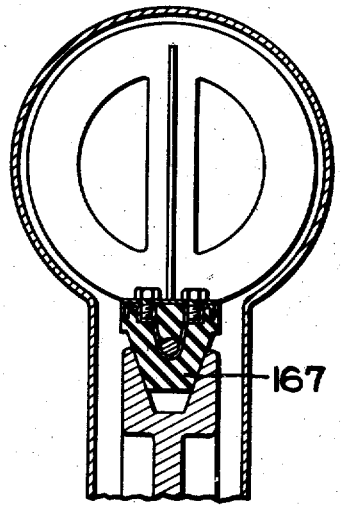
Fig. 15 is a sectional view of a still further form of conveyer belt.
Figure 5:
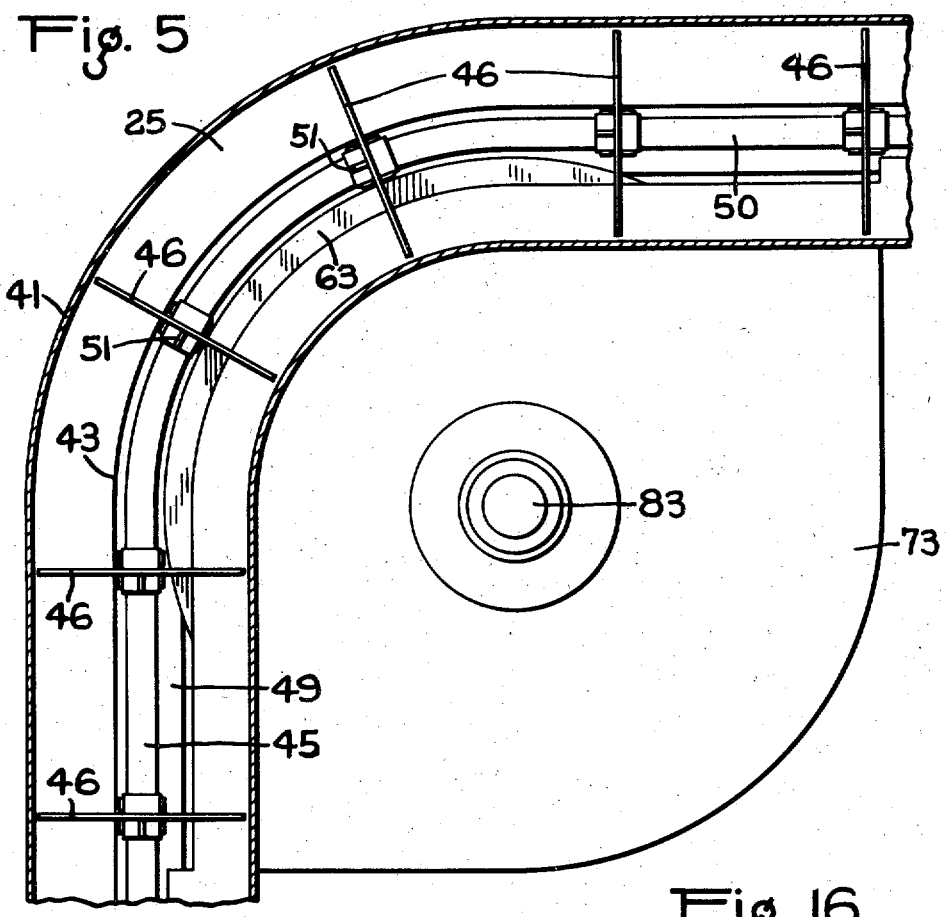
Fig. 5 is a section taken on the line 5—5 of Fig. 1.

In some instances it may be desirable to construct the conveyer with V-belt 166, shown in Fig. 14, or with the type of V-belt 167 shown in Fig. 15.

Figure 16:
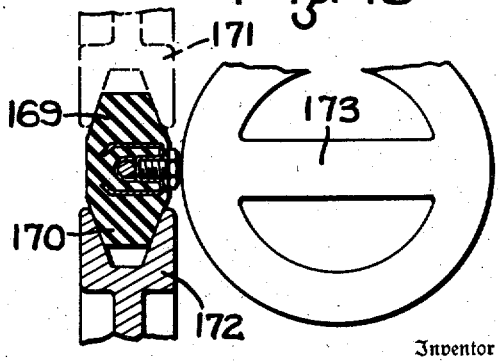
Fig. 16 is a sectional view of another form of conveyer belt.

In other cases it may be desirable to utilize the double V-belt of the form shown in Fig. 16, in which the belt has a pair of oppositely projecting V-shaped ribs 169 and 170 adapted to be supported by sheaves 171 and 172, respectively, arranged in the manner shown. In this form of the invention the flights 173 are supported from the belt so as to project laterally therefrom.

Figure 17:
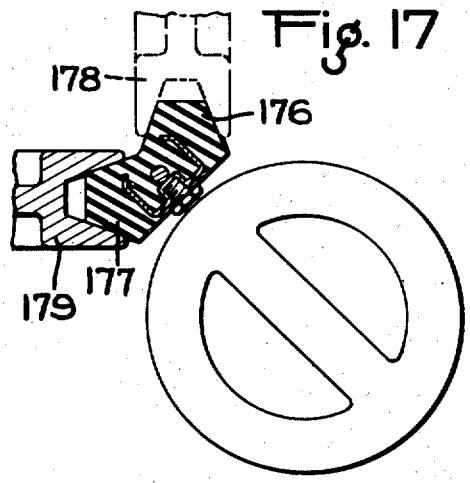
Fig. 17 is a sectional view of another form of conveyer belt.

Fig. 17 illustrates another form of double V-belt for the conveyer, comprising two V-shaped ribs 176, 177 disposed at an angle of approximately 90 degrees with respect to each other, for sheaves arranged both vertically and horizontally, as shown at 178, 179, respectively.

Fig. 18 shows the brackets 181 for the flights 182 embedded in the body of the belt 183, the flights being adapted to be detachably secured to the belt by screws 184 mounted in the brackets in the manner shown. Belt 183 is substantially similar to the belt 45.

Another manner of securing the flights to the belt is shown in Fig. 19, wherein the belt 186 has brackets 187 embedded therein, and the flights 188 are secured to said brackets by screws 189, mounted in a suitable internally threaded socket 190 formed in the bracket 187.

As shown in Figs. 20 to 23 inclusive, the conveyer can be constructed with spirals 201, 202, respectively, located at suitable points. The structural features of this form of conveyer are similar to those shown in Figs. 1 to 8 inclusive. However, the provision of the spiral sections 201, 202 enables the conveyer to be so installed that the direction of flight, for instance towards the right, can be obtained by utilizing a spiral section in which the conveying element moves in a counterclockwise direction, as shown in Fig. 20.

The conveying element 203 (Fig. 23) may be guided through the spiral sections 201, 202, by constructing the casing 204 in the form of a spiral, as shown in Fig. 22.

The dominant idea or feature of the present invention is that the conveyer has its constituent elements assembled and proportioned so that it conveys the material en masse in a circuit having many directions and extending through a combination of horizontal, vertical, inclined and angular planes. In short, the circuit of the conveyer in addition to extending through vertical and horizontal planes, also extends in the horizontal and vertical planes to the left and to the right. That is to say, the direction of the flow of material obtained by the conveyer of the present invention is such that the material is conducted through a single endless conduit in many directions, and the material can be discharged from the conveyer at any number of points located at any desired place therein.

With a conveyer made in accordance with this invention, great efficiency is attained in transporting the material and should a choke occur, the conveyer element will pull through the material and thus reduce the risk of breaking the belt and further in the circuit, should an outlet be blocked, the material will be carried round to the next outlet or round and round until the clogged outlet is free, automatically controlling the inlet.

While the preferred embodiments of the invention have been herein illustrated and described, it will be understood that the invention may be embodied in other forms within the scope of the appended claims.

I claim:

1. In a conveyer, an endless conveying element adapted to be drawn through an endless casing, comprising a series of flight units, each of said flight units having a main body portion formed of sheet metal, a reinforcing rib of sheet metal fastened edgewise to one face of the main body and having an end portion disposed substantially in alinement with one side edge of the main body portion, a bracket secured to said main body portion and to the end portion of said rib, an endless belt having a series of longitudinal ribs, means for attaching the bracket of each of said flight units to one of the ribs of said belt, and sheaves mounted in the conveyer casing for engaging other ribs of said belt for guiding the conveying element through said casing.

2. In a conveyer of the character described, in combination, a conveyer element including an endless belt having a series of radially disposed ribs formed lengthwise thereof and adapted to engage the surfaces of pulleys arranged with their axes at different angles so that the belt is retained from twisting in a predetermined position, a plurality of flights for the material to be conveyed and means carried by said belt for supporting the flights therefrom.

3. A conveyer of the character described, comprising a casing providing a pair of tubes arranged side by side and having common walls defining a slot that extends lengthwise of the conveyer, a conveying element enclosed by the casing and including an endless belt disposed in one tube and having a continuous rib projecting therefrom and disposed within said slot, and a series of flights disposed in the other tube, means for connecting said flights to the rib of said endless belt, and sheaves mounted in the conveyer casing for engaging said belt for guiding the conveying element through said casing, the belt and the flights of said conveying element being supported by said sheaves out of contact with the walls of said casing throughout the entire length of said conveyer.

4. In a conveyer of the character described, in combination, a conveyer casing providing a pair of endless tubes having a slot formed lengthwise of the conveyer therebetween, one of said tubes constituting a trough through which the material is conveyed, an endless belt within the other tube, a plurality of flights disposed within the material conveying tube, a continuous rib projecting from said belt and disposed within said slot, means for connecting said flights to the rib of said endless belt, other ribs formed lengthwise of said belt and projecting radially with respect to the main body of the belt, and sheaves mounted in the conveyer casing for engaging the other ribs of said belt for guiding the belt through said casing, the belt and the flights being supported solely by said sheaves out of contact with the walls of said casing throughout the entire length of said conveyer, said sheaves being arranged to retain the belt from twisting from a predetermined position within the casing.

5. In a conveyer of the character described, in combination, a conveyer element including an endless belt having a series of radially disposed ribs formed lengthwise thereof; pulleys arranged with their axes at different angles and engaging said ribs for retaining said belt against twisting from a predetermined position, a plurality of flights for the material to be conveyed, and means carried by said belt for supporting the flights therefrom.

6. In a conveyer of the character described, in combination, a conveyer casing providing a pair of endless tubes having a slot formed lengthwise of the conveyer therebetween, one of said tubes constituting a trough through which the material is conveyed, a plurality of flights disposed within the material conveying tube, an endless belt within the other tube, said belt having a series of radially disposed ribs formed lengthwise thereof, pulleys carried by said conveyer casing arranged at different angles and engaging the ribs for guiding said belt and for retaining it against twisting from a predetermined position, and means carried by said belt for supporting said flights therefrom.

7. In a conveyer, the combination of a conveyer casing providing a pair of endless tubes having therebetween a slot formed lengthwise of the conveyer, said conveyer tubes including longitudinally, upwardly and transversely extending legs with arcuate sections connecting said legs, one of said tubes constituting a trough through which material is conveyed, a plurality of flights disposed within the material conveying tube, an endless belt within the other tube, said belt having a series of radially disposed ribs formed lengthwise thereof, pulleys in the arcuate sections of said belt containing tube arranged at different angles and engaging the ribs for guiding said belt for retaining it against twisting from a predetermined position, and means carried by said belt for supporting the flights therefrom.

8. In a conveyer, a conveyer casing of irregular loop form providing a pair of endless tubes having slots formed lengthwise therebetween, one of said tubes constituting a material conveying tube, an endless belt within the other tube, a plurality of flights disposed within the material conveying tube, means for attaching the flights to said belt, said belt having a series of angularly related radially disposed ribs formed lengthwise thereof, and pulleys for engaging each of said plurality of ribs, the axis of each pulley being at right angles with respect to the radial center line of the rib it engages.

9. In a conveyer, the combination of a conveyer casing providing a pair of endless tubes having therebetween a slot formed lengthwise of the conveyer, said conveyer tubes including longitudinally, upwardly and transversely extending legs with arcuate sections connecting said legs, one of said tubes constituting a trough through which material is conveyed, an endless belt within the other tube, a plurality of flights disposed within the material conveying tube, means carried by said belt for supporting the flights therefrom, said belt having a series of radially disposed ribs formed lengthwise thereof, the longitudinally, upwardly and transversely extending legs of said endless belt containing tube having its inside surface conforming with the shape of said belt and fitting closely thereabout for retaining said belt against twisting from a predetermined position, and anti-friction means in the arcuate sections of said endless belt containing tube for guiding said belt through said arcuate sections.

EUGENE E. BRUNNER.